US011487607B2

(12) United States Patent
Erickson et al.

(10) Patent No.: US 11,487,607 B2
(45) Date of Patent: Nov. 1, 2022

(54) AUTOMATED RECOVERY OF EXECUTION ROLES IN A DISTRIBUTED ONLINE SYSTEM

(71) Applicant: AVEVA SOFTWARE, LLC, Lake Forest, CA (US)

(72) Inventors: Brian Kenneth Erickson, Long Beach, CA (US); Arun Kumar Nattamai Ramdoss, Mission Viejo, CA (US); Vinay T. Kamath, Rancho Santa Margarita, CA (US); Abhijit Manushree, Laguna Niguel, CA (US)

(73) Assignee: AVEVA SOFTWARE, LLC, Lake Forest, CA (US)

( * ) Notice: Subject to any disclaimer, the term of this patent is extended or adjusted under 35 U.S.C. 154(b) by 0 days.

(21) Appl. No.: 17/126,304

(22) Filed: Dec. 18, 2020

(65) Prior Publication Data
US 2021/0182142 A1 Jun. 17, 2021

Related U.S. Application Data

(63) Continuation of application No. 15/856,874, filed on Dec. 28, 2017, now Pat. No. 10,901,833.

(51) Int. Cl.
G06F 11/07 (2006.01)
G06F 11/34 (2006.01)
G06F 11/30 (2006.01)

(52) U.S. Cl.
CPC ...... G06F 11/0793 (2013.01); G06F 11/0709 (2013.01); G06F 11/079 (2013.01); G06F 11/0754 (2013.01); G06F 11/0787 (2013.01); G06F 11/3006 (2013.01); G06F 11/3433 (2013.01); G06F 11/3452 (2013.01); G06F 11/3495 (2013.01)

(58) Field of Classification Search
CPC ............. G06F 11/0793; G06F 11/3452; G06F 11/3433; G06F 11/0709; G06F 11/0754; G06F 11/3495; G06F 11/079; G06F 11/3006; G06F 11/0787; G06F 11/0748; G06F 11/0736
USPC ...................................................... 714/15
See application file for complete search history.

(56) References Cited

U.S. PATENT DOCUMENTS

| 6,704,737 | B1 | 3/2004 | Nixon et al. |
| 2003/0177408 | A1 | 9/2003 | Fields et al. |
| 2004/0153823 | A1* | 8/2004 | Ansari ............... G06F 11/0715 714/38.14 |
| 2007/0010721 | A1 | 1/2007 | Chen et al. |
| 2008/0071817 | A1 | 3/2008 | Gaurav et al. |
| 2008/0077632 | A1 | 3/2008 | Tysowski et al. |

(Continued)

OTHER PUBLICATIONS

Wikipedia "Windows Azure caching" page, retrieved from https://en.wikipedia.org/wiki/Windows_Azure_Caching (Year: 2022).*

(Continued)

Primary Examiner — Yair Leibovich
(74) Attorney, Agent, or Firm — Greenberg Traurig, LLP

(57) ABSTRACT

Automated recovery of execution roles in a distributed historian system in accordance with actions and rules customized to each execution role. A monitoring service monitors the health status of execution roles and automatically performs a corrective action in response to the health state of an execution role triggering a predetermined rule.

18 Claims, 7 Drawing Sheets

(56) References Cited

U.S. PATENT DOCUMENTS

| | | |
|---|---|---|
| 2009/0006954 A1 | 1/2009 | Jackson et al. |
| 2010/0332510 A1 | 12/2010 | Gitai et al. |
| 2013/0152047 A1* | 6/2013 | Moorthi ............... G06F 11/368 717/124 |
| 2015/0146716 A1* | 5/2015 | Olivier ............... H04L 65/1016 370/352 |
| 2015/0193477 A1 | 7/2015 | Dumant et al. |
| 2018/0109955 A1* | 4/2018 | Nixon ................ G06F 16/2428 |

OTHER PUBLICATIONS

Wikipedia "Windows Azure Caching" page, retrieved from https://en.wikipedia.org/wiki/Windows_Azure_Caching (Year: 2019).

Wikipedia "Microsoft Azure" page, retrieved from https://en.wikipedia.org/wiki/Microsoft_Azure (Year: 2019).

\* cited by examiner

AUTOMATED RECOVERY OF EXECUTION ROLES IN A DISTRIBUTED ONLINE SYSTEM

CROSS REFERENCE

This application is a continuation of U.S. patent application Ser. No. 15/856,874, filed Dec. 28, 2017, the entire contents of which are incorporated by reference herein.

TECHNICAL FIELD

Aspects of the present disclosure generally relate to the fields of networked computerized industrial control, automation systems, networked computerized systems utilized to monitor, log, and display relevant manufacturing/production events and associated data, and supervisory level control and manufacturing systems. More particularly, aspects relate to systems and methods for recovery of execution roles in a distributed online historian system, such as a managed historian for example.

BACKGROUND

Online historians utilize cloud computing environments to provide a multi-tenant software-as-a-service solution for storing and enabling access to historical data, such as time-series data for example, relating to continuous processes and their associated outputs. Online historians utilize execution roles that at times may enter unstable states for various reasons, such as a process running out of thread, insufficient available memory, dead locks, and the like, any of which can cause interruptions in availability of the online historian. Conventional techniques rely on end-customer users manually finding and reporting problems to the provider of the online historian. Human personnel of the online historian provider then must manually review log files and the like and manually perform actions to correct the problems. Such a reactive approach results in long downtimes and requires high availability of human personnel for troubleshooting. Some conventional cloud computing environments include systems that monitor the health of virtual machines within the cloud environment and take basic recovery actions such as removing a role from a load balancer and initiating additional execution roles. But these techniques rely on general conditions and are unable to support condition customization.

SUMMARY

Aspects of the present disclosure provide "self-healing" automated recovery of execution roles in a distributed historian (e.g., managed historian) system in accordance with actions and rules customized to each execution role. A monitoring service monitors the stability (e.g., health) status of execution roles within a distributed historian system and automatically performs a predetermined corrective action in response to the health state of an execution role triggering a predetermined rule. Advantageously, aspects of the present disclosure to provide a single place to monitor and configure rules and actions customized to individual execution roles, an extensible interface and plug-in-based approach for the rules and actions, and default and domain-specific customizable rules and actions.

In an aspect, a distributed historian system includes at least one historian processor and at least one computer-readable storage medium communicatively coupled to the historian processor and storing processor-executable instructions. The historian processor is communicatively coupled, via a communications network, to one or more data collectors within a continuous process and one or more user computing devices. The processor-executable instructions include a monitoring service, a memory cache worker role, and execution roles executing within a compute component of the distributed historian system. The execution roles each register with the monitoring service during startup of the execution roles by creating at least one rule associated with a health state of the execution role and creating at least one action associated with each created rule. Each execution role transmits data representative of its health state to the memory cache worker role. The monitoring service retrieves the data representative of the health state of each registered execution role from the memory cache worker role. The monitoring service then compares the retrieved data representative of the health state of each registered execution role with the at least one rule associated with each registered execution role. And the monitoring service performs the at least one action associated with the rule on the associated execution role automatically in response to the rule matching the retrieved health state of the execution role.

In other aspects, a computer implemented method and a computer readable storage device are provided.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
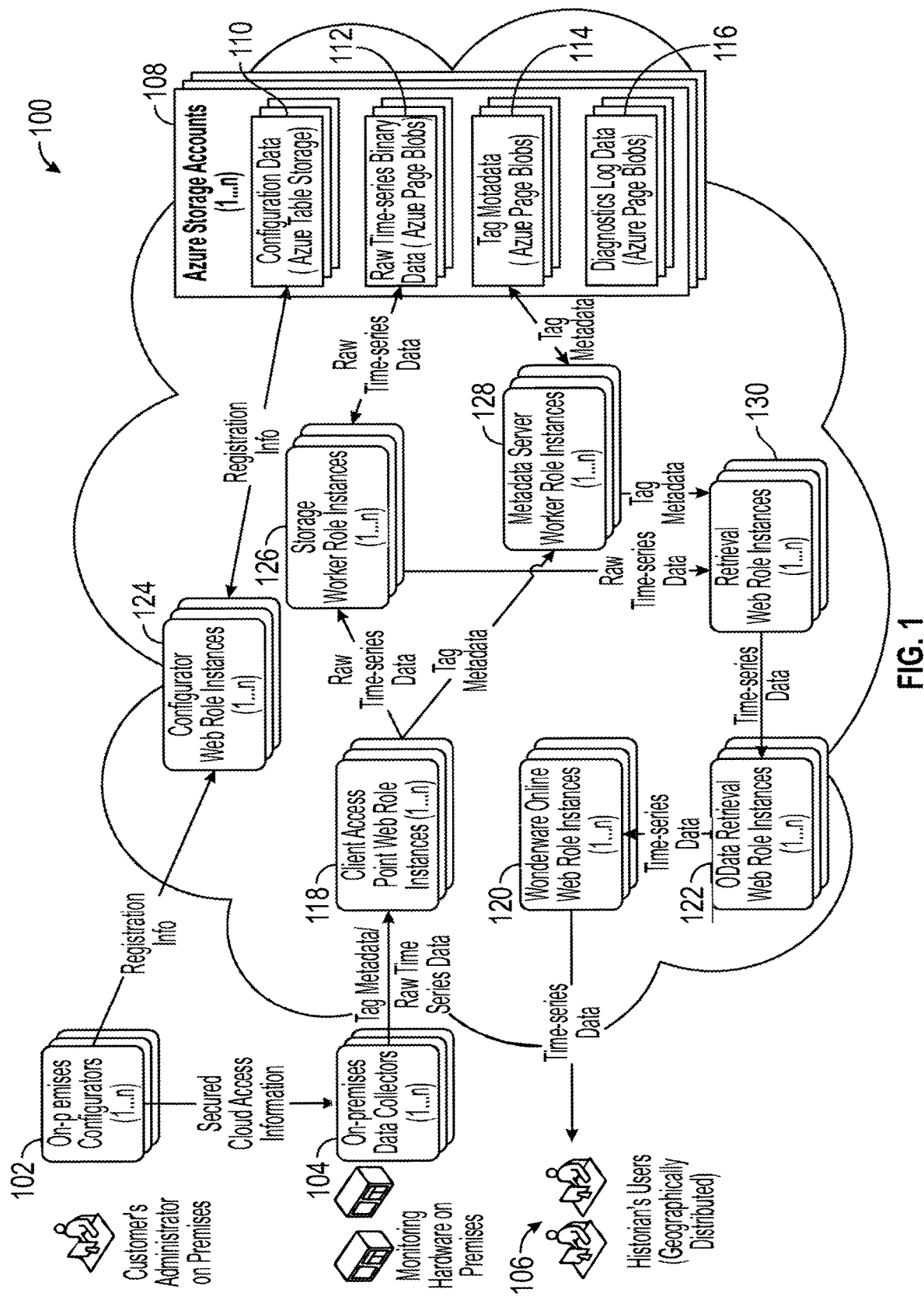
FIGS. 1 and 2 each illustrate aspects of an architecture of an exemplary historian system according to an embodiment.

Referring to FIG. 1, a distributed historian system, generally indicated at 100, is configured to store time-series data and enable users to access the data, even if the data is stored in different data sources. Although described herein with reference to a distributed historian system, one of ordinary skill in the art will understand that aspects of the present disclosure may be implemented in other distributed systems. The historian system 100 is configured to store and use data from various locations and facilities and use cloud storage technology (e.g., a cloud computing service) to ensure that all the facilities are connected to all the necessary data. The system 100 forms connections with configurators 102, data collectors 104, and user computing devices 106 on which the historian data can be accessed. The configurators 102 are computer-executable modules that may be used by system administrators to configure the functionality of the historian system 100. The data collectors 104 are computer-executable modules that connect to and monitor hardware in the process control system to which the historian system 100 is connected. The data collectors 104 and configurators 102 may be at different locations throughout the process control system. The user computing devices 106 comprise computing devices that are geographically distributed, enabling historian data from the system 100 to be accessed from various locations across a country or throughout the world.

In an embodiment, historian system 100 stores a variety of types of data in storage accounts 108. This information includes configuration data 110, raw time-series binary data 112, tag metadata 114, and diagnostic log data 116. The storage accounts 108 may be organized to use table storage or other configuration, such as page blobs.

The historian system 100 implements one or more execution roles, such as instances of web roles and/or instances of worker roles. A web role is a cloud execution service configured to execute web applications that are supported by Internet Information Services (IIS). A worker role is a cloud execution service configured to execute applications and service-level tasks, which generally do not require IIS support. Aspects of the present disclosure provide "self-healing" automated recovery of execution roles in historian system 100. As described below, a monitoring service (see FIG. 4) monitors the stability, or heath, of execution roles within historian system 100 and automatically performs a predetermined corrective action in response to the health state of an execution role triggering a predetermined rule.

In an embodiment, historian system 100 is accessed via web role instances. As shown, configurators 102 access configurator web role instances 124. And data collectors 104 access client access point web role instances 118. Online web role instances 120 are accessed by the user computing devices 106. The configurators 102 share configuration data and registration information with the configurator web role instances 124. The configuration data and registration information is stored in the storage accounts 108 as configuration data 110. The data collectors 104 share tag metadata and raw time-series data with the client access point web role instances 118. The raw time-series data is shared with storage worker role instances 126 and then stored as raw time-series binary data 112 in the storage accounts 108. The tag metadata is shared with metadata server worker role instances 128 and stored as tag metadata 114 in the storage accounts 108. The storage worker role instances 126 and metadata server worker role instances 128 send raw time-series data and tag metadata to retrieval worker role instances 130. The raw time-series data and tag metadata is converted into time-series data and sent to the online web role instances 120 via data retrieval web role instances 122. Users using the user computing devices 106 receive the time-series data from the online web role instances 120.

Figure 2:
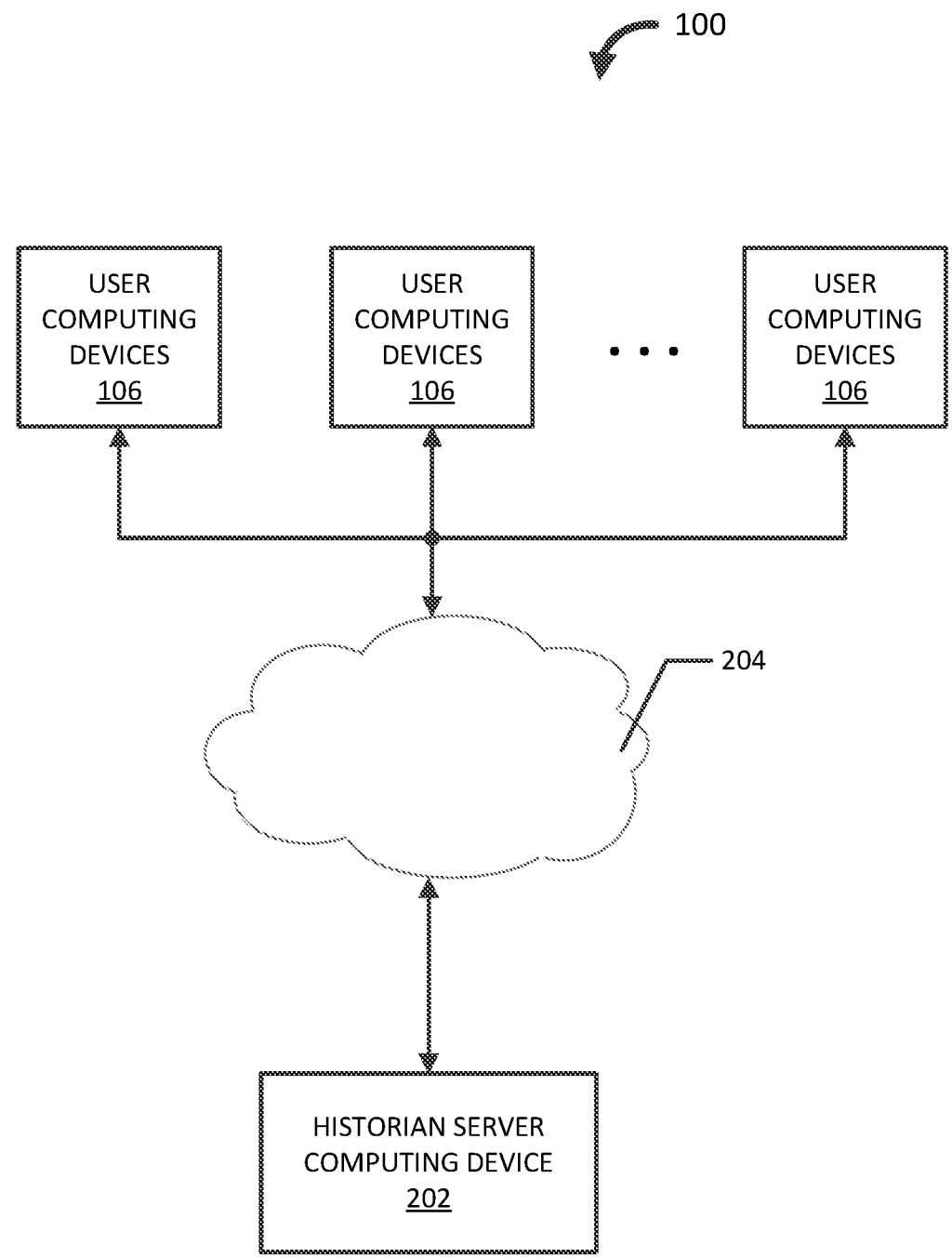

FIG. 2 illustrates aspects of historian system 100 from a slightly different perspective. As illustrated in FIG. 2, one or more user computing devices 106 are communicatively coupled to a historian server computing device 202 via a communications network 204. Although illustrated in FIG. 2 as a single device, one of ordinary skill in the art will understand that historian server computing device 202 may comprise one or more server computing devices communicatively coupled and forming a cloud computing environment, such as Microsoft Azure for example. In an embodiment, the storage accounts 108 and data therein are stored on computer-readable storage devices (e.g., memory) of historian server computing device 202 and the web role instances (e.g., client access point web role instances 118, online web role instances 120, data retrieval web role instances 122, configurator web role instances 124, storage worker role instances 126, metadata server worker role instances 128, retrieval worker role instances 130, etc.) execute on a processor of historian server computing device 202.

The user computing devices 106 are configured to receive and display data stored on historian server computing device 202. Exemplary user computing devices include, but are not limited to, tablet computing devices, smartphones, laptop computing devices, desktop computing devices, workstations, and the like.

The communications network 204 is capable of facilitating the exchange of data among various components of historian system 100, including user computing devices 106 and historian server computing devices 202. The communications network 204 in the embodiment of FIG. 2 includes a wide area network (WAN) and/or a local area network (LAN) that is connectable to other telecommunications networks, including other WANs, LANs, and/or portions of the Internet or an intranet. The communications network 204 may be any telecommunications network that facilitates the exchange of data, such as those that operate according to the IEEE 802.3 (e.g., Ethernet) and/or the IEEE 802.11 (e.g., Wi-Fi) protocols, for example. In another embodiment, communications network 204 is any medium that allows data to be physically transferred through serial or parallel communication channels (e.g., copper wire, optical fiber, computer bus, wireless communication channel, etc.). In an embodiment, communications network 204 comprises at least in part a process control network. In another embodiment, communications network 204 comprises at least in part a supervisory control and data acquisition (SCADA) system. In yet another embodiment, communications network 204 comprises at least in part an enterprise manufacturing intelligence (EMI)/operational intelligence (OI) system.

Figure 3:
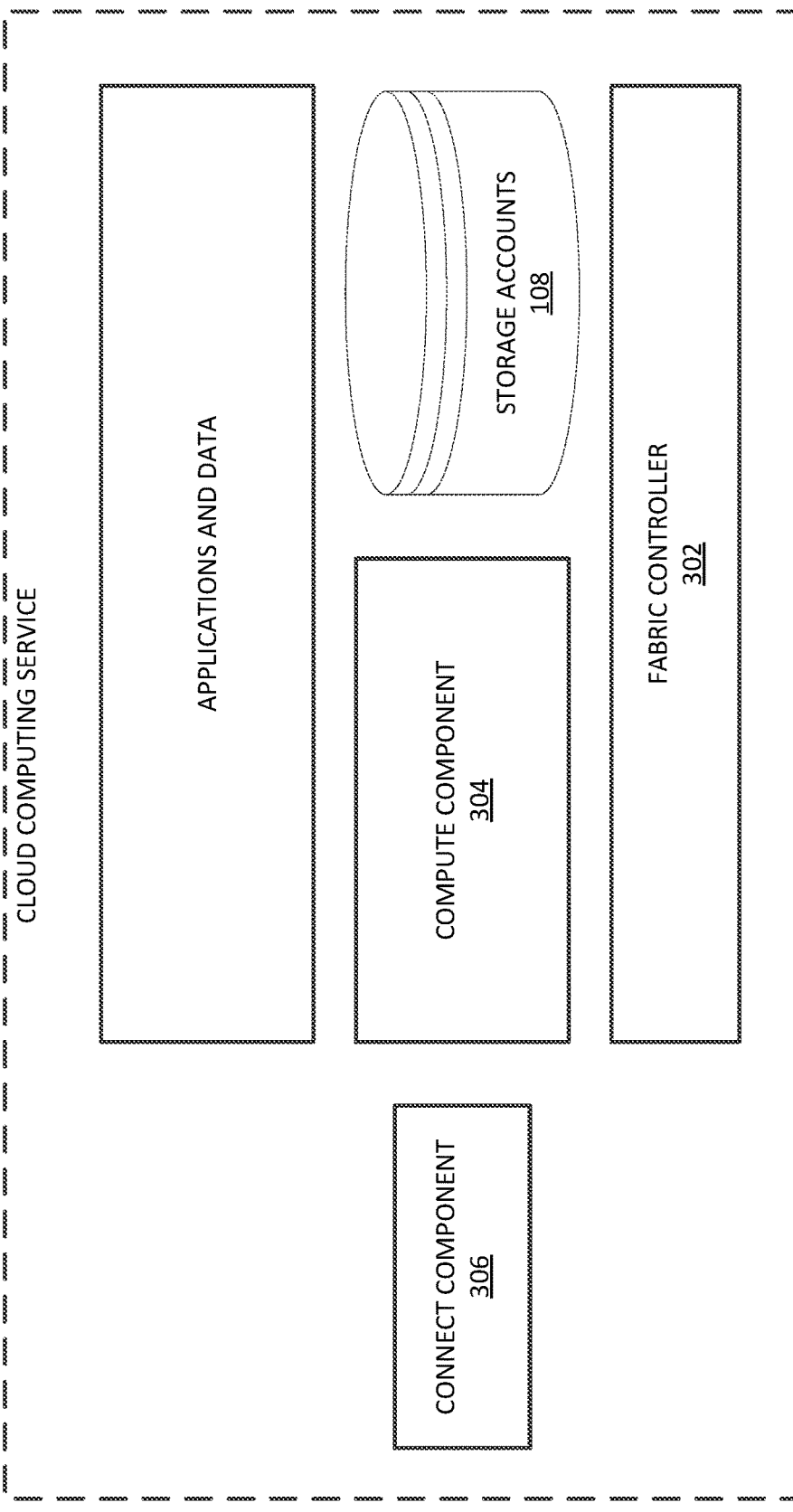
FIG. 3 illustrates an exemplary cloud computing service of the historian system of FIG. 1.

FIG. 3 illustrates an exemplary embodiment of a cloud computing service of historian system 100. As illustrated, the cloud computing service includes a fabric controller 302, a compute component 304, a connect component 306, and the storage accounts 108. The fabric controller 302 is configured to deploy, manage, and monitor the applications executing on the cloud computing service. The compute component 304 is configured to execute the applications on the cloud computing service. The connect component 306 is configured to enable creating connections between on-premises computing devices (e.g., user computing devices 106) and the applications (e.g., Wonderware Online, etc.) executing on compute component 304. In an embodiment, the connections are at an Internet Protocol (IP) level. The storage accounts 108 are configured to store a variety of types of data in the cloud computing service as further described herein. The cloud computing service may optionally include a content delivery network (not illustrated) configured to enhance access to data in storage accounts 108 by caching the data. In an embodiment the cloud computing service comprises a distributed historian system, such as a managed historian and the like for example, of historian system 100. As explained above, conventional techniques utilize fabric controller 302 to implement automated recovery. Implementing automated recovery with the fabric controller 302 is unable to handle situations in which the triggering event is a condition specific to a business use, system metrics, application insights, or the like.

Figure 4:
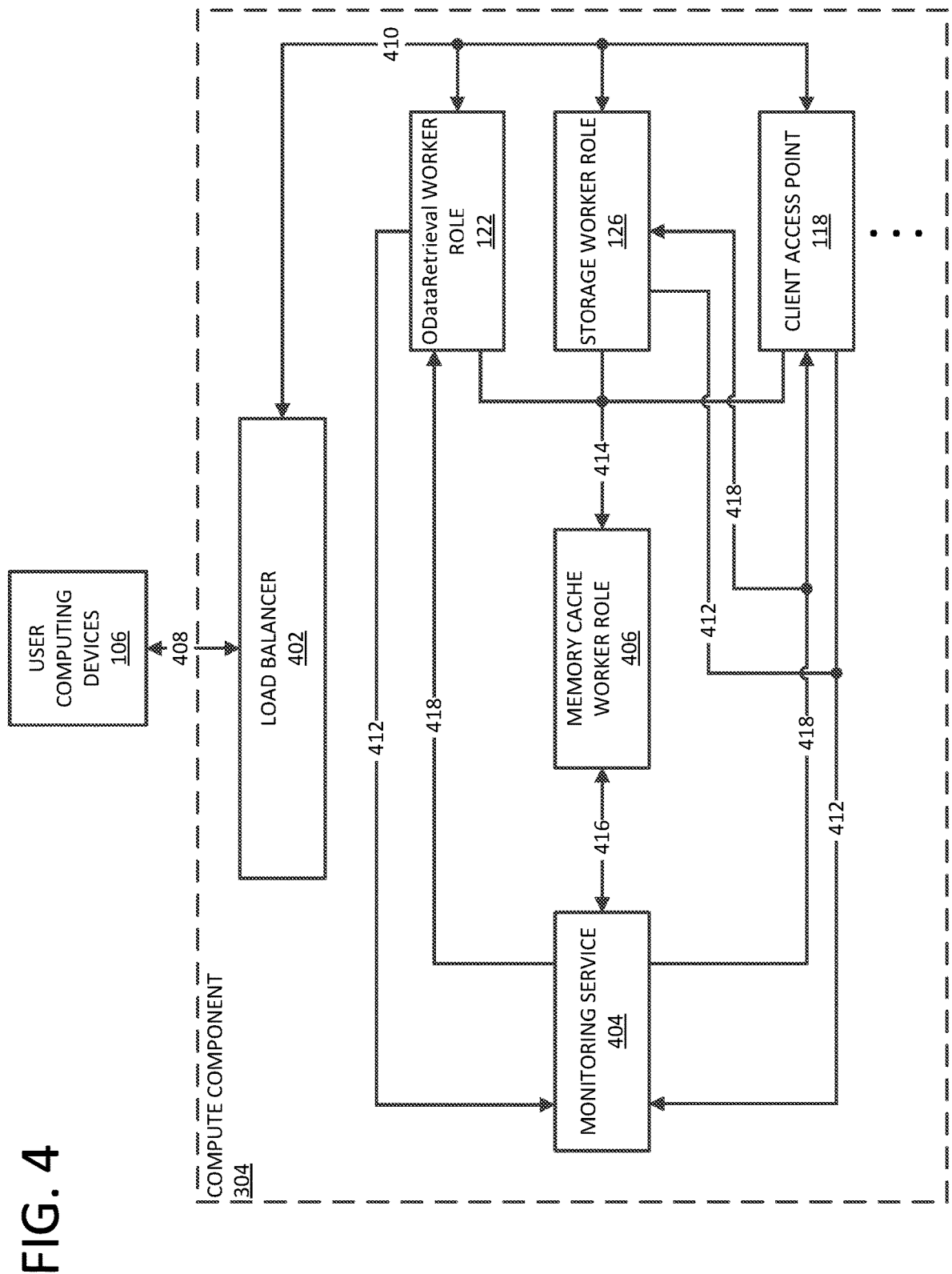
FIG. 4 illustrates an exemplary compute component of the historian system of FIG. 1 and an automated recovery process of execution roles in the historian system.

FIG. 4 illustrates an embodiment of compute component 304 within the cloud computing service of historian system 100 in accordance with an aspect of the disclosure. The compute component includes a load balancer 402, a monitoring service 404, a memory cache worker role 406, the data retrieval web role instances 122, the storage worker role instances 126, and the client access point web role instances 118. One of ordinary skill in the art will understand that the inclusion of additional worker role and/or web role instances is within the scope of the present disclosure. In an embodiment, worker role and web role instances are referred to as execution roles.

The load balancer 402 is configured to receive requests from user computing devices 106 and redirect the call requests to backend services (e.g., data retrieval web role instances 122, storage worker role instances 126, client access point web role instances 118, etc.) based on a round-robin scheduling algorithm. The memory cache worker role 406 is configured to receive data representing a current health state of each execution role and store the received health state data. Additionally or alternatively, compute component 304 may include one or more trace global logs for receiving and storing the health state data.

The monitoring service 404 is configured to monitor a current health state of each role registered therewith, determine whether the current health state of an individual role triggers a predetermined corrective action for the health state of that individual role, and automatically implement the corrective action on the role. In an embodiment, monitoring service 404 comprises a kernel of historian system 100 that keeps track of individual execution role health. The monitoring service 404 may be referred to as a WWOnlineDoctor in accordance with one or more embodiments of the disclosure. Beneficially, monitoring service 404 enables aspects of the present disclosure to provide a single place to monitor and configure rules and actions for distributed cloud applications, an extensible interface and plug-in-based approach for rules and actions, and default and domain-specific customizable rules and actions.

The monitoring service 404 utilizes one or more predetermined rules associated with health states of each execution role and one or more predetermined actions associated with each predetermined rule. For example, the monitoring service 404 may store the predetermined rules and actions directly or may access the predetermined rules and actions stored on a memory of historian server computing device 202. The predetermined rules and actions may be default (e.g., applicable to all execution roles) and/or customized to one or more particular execution roles (e.g., per web or worker role responsibility, etc.). For example, customized rules and actions may be specific to a domain, business, system metric, application insight, or the like. Table 1 includes an exemplary and non-limiting list of predetermined rules and actions for execution roles.

TABLE 1

| Execution Role | Rule | Action | Description |
| --- | --- | --- | --- |
| ODATA | Out of memory or out of thread | Restart Role | Restarts the problematic node or instance |
| Storage | Blocks corruption | Execute a custom application (e.g., storage doctor) | Invokes a storage doctor application to fix the corrupted blocks |
| Retrieval | Out of memory | Restart the Retrieval (e.g., aahRetrieval) process | Generate a state dump of the problematic process; restart only the problematic |

TABLE 1-continued

| Execution Role | Rule | Action | Description |
| --- | --- | --- | --- |
| | | | process instead of restarting the role |

An exemplary operation of the embodiment of compute component 304 illustrated in FIG. 4 includes a method of automated recovery of the execution roles. The load balancer receives, at 408, requests from user computing devices 106 and redirects the call requests to backend services at 410. Each execution role registers, at 412, with the monitoring service 404 upon startup of the execution roles. In an embodiment, the registering includes creating at least one rule associated with a health state of the execution role and creating at least one action associated with each created rule. During operation of the execution roles, the execution roles transmit, at 414, their current health states to the memory cache worker role 406, which stores the health states. The monitoring service 404 retrieves, at 416, the current health state of each registered service role from the memory cache worker role 406. The monitoring service 404 compares the retrieved current health states of the execution roles with the rule(s) associated with each execution role. When the current health state of an execution role does not satisfy (e.g., does not "trigger") any rules for the execution role then operation of the execution role continues because the health of the execution role is within allowed bounds. When the current health state of an execution role satisfies (e.g., "triggers") at least one rule for the execution role then the monitoring service 404 performs, at 418, the action(s) associated with the satisfied rules for that execution role. Exemplary actions include, but are not limited to, reboot, alert, detach the execution role from load balancer 402 for offline analysis, auto-scale, and any custom action that adheres to the IAction interface.

Figure 5:
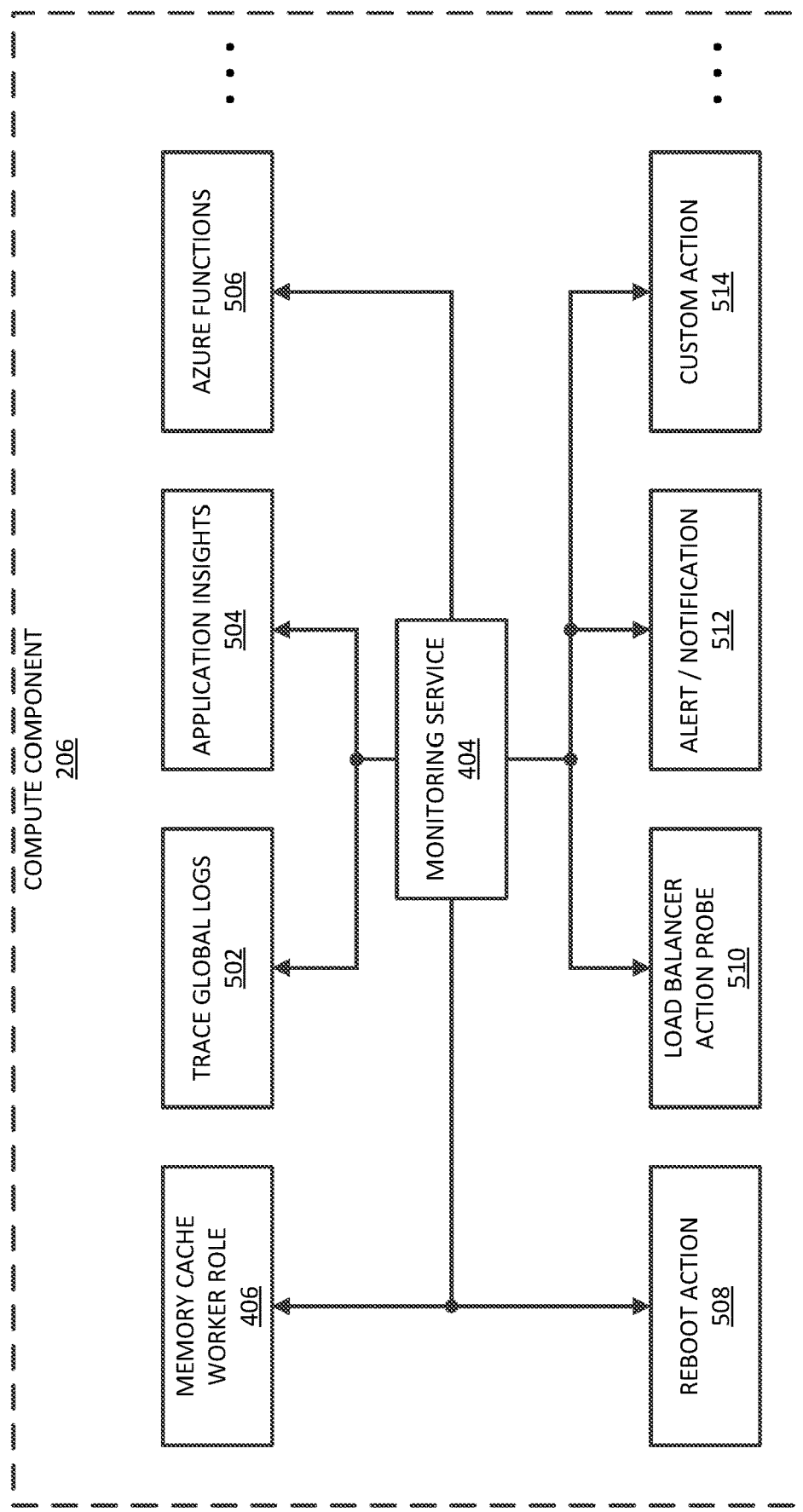
FIG. 5 illustrates exemplary rules and actions implemented by a monitoring service according to an embodiment.

FIG. 5 illustrates an exemplary embodiment of rules and actions of implemented by monitoring service 404 in accordance with an embodiment of the disclosure. As illustrated in FIG. 5, the monitoring service 404 is configured to retrieve health state data of the execution roles from memory cache worker role 406, one or more trace global logs 502, application insights 504, Azure functions 506, and the like. Moreover, the monitoring service 404 is configured to perform a reboot action 508, perform a load balancer action probe 510, generate an alert or notification 512 (e.g., on user computing device 106), perform a custom action (e.g., adhering to the IAction interface), and the like.

Figure 6:
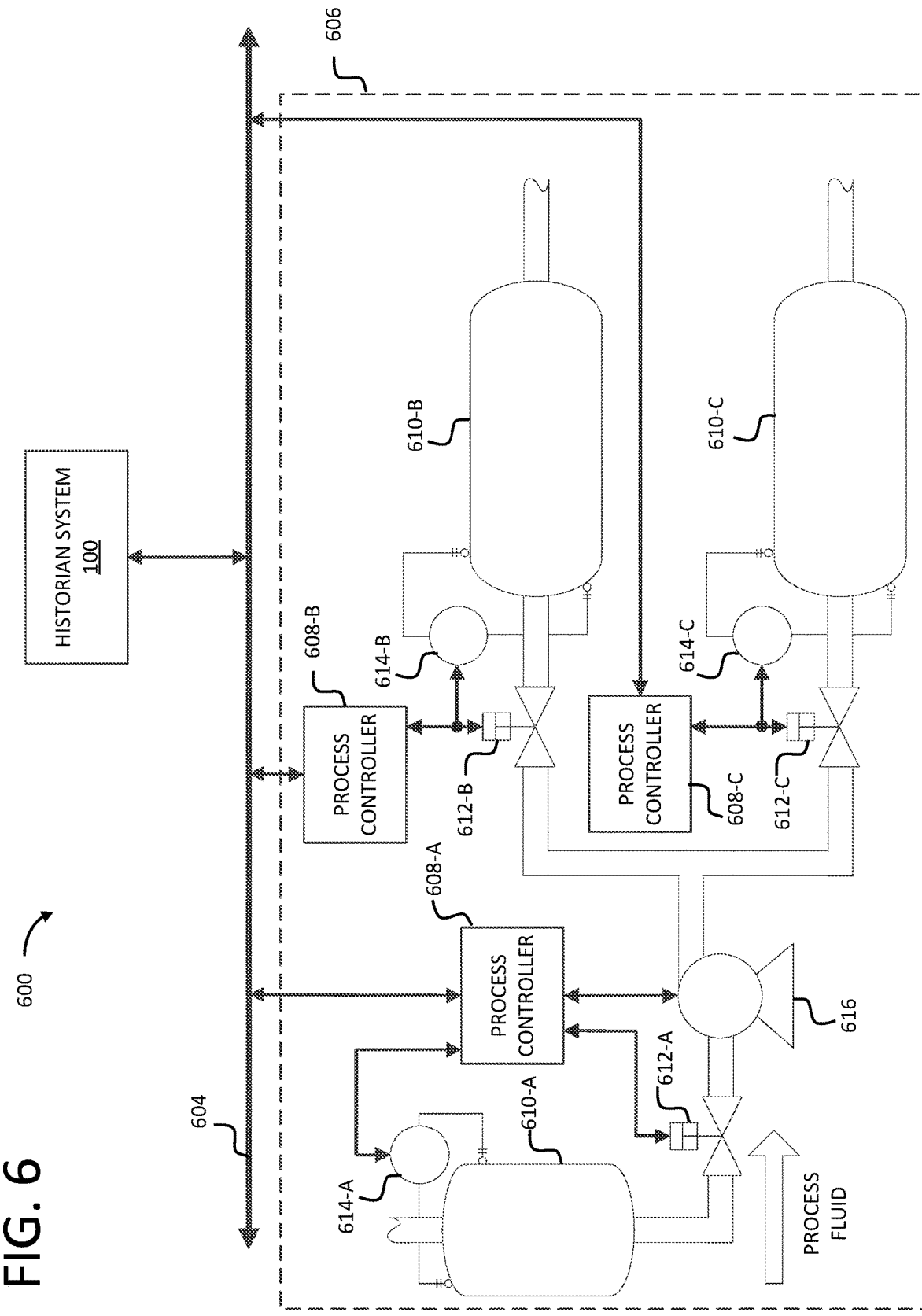
FIG. 6 illustrates an exemplary industrial process system within which aspects of the disclosure are incorporated according to an embodiment.

FIG. 6 illustrates an exemplary system, generally indicated at 600, within which an embodiment of the disclosure may be incorporated. The system 600 includes the historian system 100, a communications infrastructure 604, and an exemplary plant, such as a fluid processing system 606. As illustrated, the fluid processing system 606 includes process controllers 608, tanks 610, valves 612, sensors 614, and a pump 616. In an embodiment, the historian system 100, the communications infrastructure 604, the process controllers 608, and the sensors 614 comprise at least in part a process control network, a SCADA system, and/or an EMI/OI system. In system 600, historian system 100, process controllers 608, the tanks 610, the valves 612, sensors 614, and the pump 616 are communicatively coupled via communications infrastructure 604.

The communications infrastructure 604 is capable of facilitating the exchange of data among various components of system 600, including historian system 100 and components of fluid processing system 606 (e.g., process controllers 608, valves 612, sensors 614, etc.). In an embodiment, communications infrastructure 604 comprises communications network 204. The communications infrastructure 604 in the embodiment of FIG. 6 includes a local area network (LAN) that is connectable to other telecommunications networks, including other LANs or portions of the Internet or an intranet. The communications infrastructure 604 may be any telecommunications network that facilitates the exchange of data, such as those that operate according to the IEEE 802.3 (e.g., Ethernet) and/or the IEEE 802.11 (e.g., Wi-Fi) protocols, for example. In another embodiment, communications infrastructure 604 is any medium that allows data to be physically transferred through serial or parallel communication channels (e.g., copper wire, optical fiber, computer bus, wireless communication channel, etc.).

Still referring to FIG. 6, the fluid processing system 606 is adapted for changing or refining raw materials to create end products. It will be apparent to one skilled in the art that aspects of the present disclosure are capable of optimizing processes and processing systems other than fluid processing system 606 and that system 606 is presented for illustration purposes only. Additional exemplary processes include, but are not limited to, those in the chemical, oil and gas, food and beverage, pharmaceutical, water treatment, and electrical power industries. For example, processes may include conveyers, power distribution systems, and/or processes or operations that cannot be interrupted. In an embodiment, process controllers 608 provide an interface or gateway between components of fluid processing system 606 (e.g., valves 612, sensors 614, pump 616) and other components of system 600. In another embodiment, components of fluid processing system 606 communicate directly with system and process 100 via communications infrastructure 204. In yet another embodiment, process controllers 608 transmit data to and receive data from historian system 100, valves 612, sensors 614, and/or pump 616 for controlling and/or monitoring various aspects of fluid processing system 606. The processor controllers 608 and/or sensors 614 comprise the data collectors 104 in accordance with one or more aspects of the present disclosure.

The process controllers 608 of FIG. 6 are adapted to control and/or monitor aspects of fluid processing system 606. In an embodiment, processor controllers 608 are programmable logic controllers (PLC) that control and collect data from aspects of fluid processing system 606. In another embodiment, process controllers 608 are adapted to execute real-time applications that receive configuration data values and real-time data values from historian system 100 and transmit real-time data values (e.g., time-series data values) to historian system 100, as further described herein.

Figure 7:
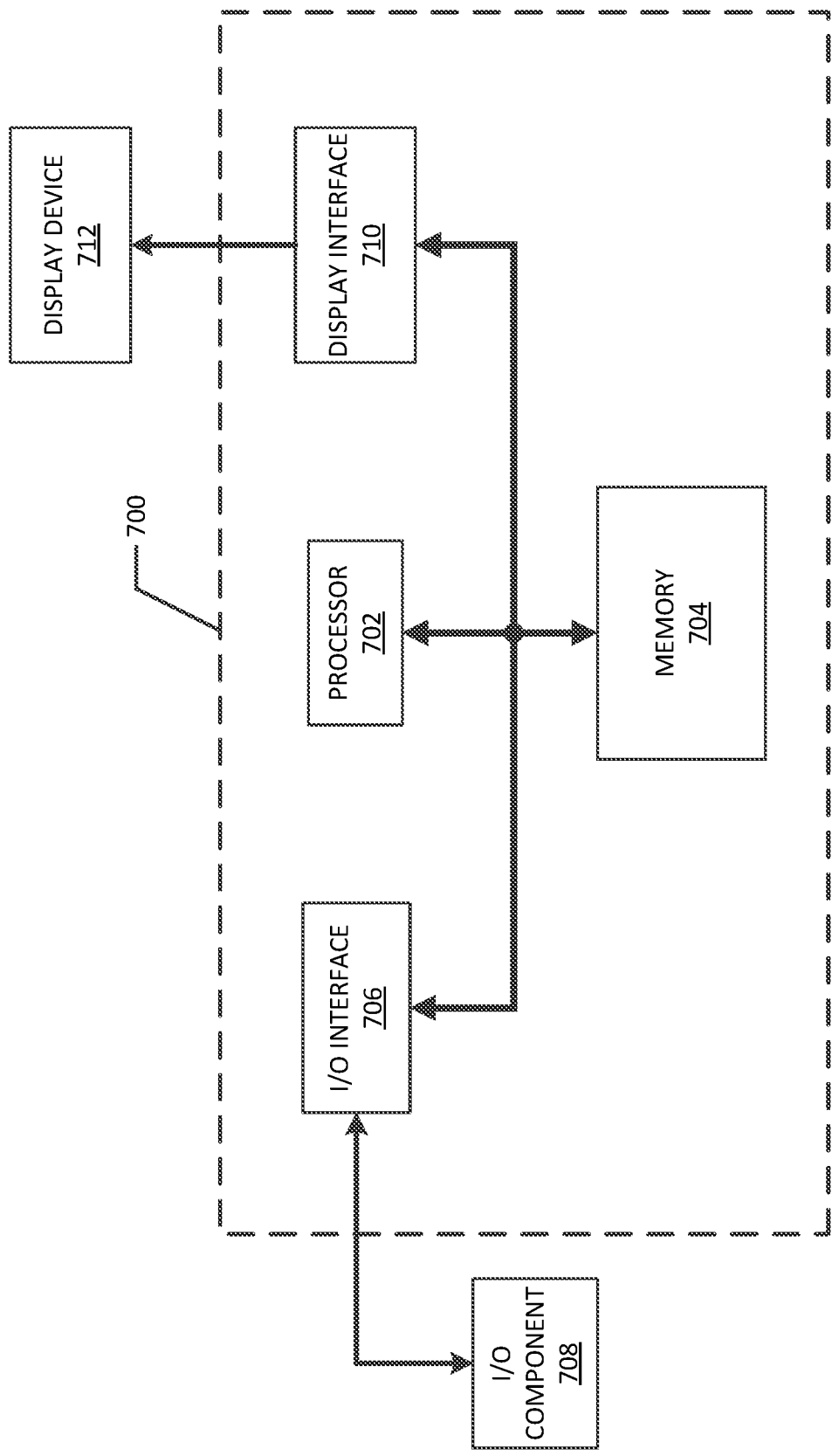
FIG. 7 is a block diagram of an exemplary computing device architecture within which aspects of the disclosure are implemented according to an embodiment.

FIG. 7 illustrates an exemplary architecture of a computing device 700 (e.g., user computing devices 106, historian server computing device 202, etc.) programmed to provide aspects of the systems and processes described herein via a software environment. In this embodiment, the computing device 700 includes a processor 702, a memory 704, an input/output (I/O) interface 706 that interfaces with an I/O component 708, and display interface 710. In an embodiment, the memory 704 includes storage accounts 108, fabric controller 302, compute component 304, connect component 306, and the applications and data each embodied in processor-executable instructions for executing by processor 702. In this manner, the computing device 700 comprises a special-purpose computing device for automated recovery of execution roles in distributed historian system 100 in accordance with an aspect of the disclosure.

The processor 702, memory 704, I/O interface 706, and display interface 710 are communicatively connected and/or electrically connected to each other. The I/O interface 706 is communicatively and/or electrically connected to the I/O component 708. The processor 702 is adapted to execute processor-executable instructions stored in the memory 704 for automatically recovering execution roles in historian system 100 in accordance with a framework (e.g., rules and actions) customized to the execution roles. The I/O interface 706 of FIG. 7 provides a physical data connection between the computing device 700 and I/O component 708. In an embodiment, I/O interface 706 is a network interface card (NIC) or modem and I/O component 708 is a telecommunications network (e.g., communications network 204). The display interface 710 provides a physical data connection between computing device 700 and a display device 712. In an embodiment, display device 712 is a touchscreen of a smartphone, tablet computing device, or the like.

In an aspect, a distributed historian system (e.g., historian system 100) includes at least one historian processor (e.g., processor 702) and at least one computer-readable storage medium (e.g., memory 704) communicatively coupled to the historian processor and storing processor-executable instructions. One of ordinary skill in the art will understand that aspects of the present disclosure are not limited to distributed historian systems and may include other distributed systems. The historian processor is communicatively coupled, via a communications network (e.g., communications network 204), to one or more data collectors (e.g., data collectors 104) within a continuous process (e.g., fluid processing system 606) and one or more user computing devices (e.g., user computing devices 106). The processor-executable instructions include a monitoring service (e.g., monitoring service 404), a memory cache worker role (e.g., memory cache worker role 406), and execution roles (e.g., data retrieval web role instances 122, storage worker role instances 126, client access point web role instances 118, etc.) executing within a compute component (e.g., compute component 304) of the distributed historian system. The execution roles each register (412) with the monitoring service during startup of the execution roles by creating at least one rule associated with a health state of the execution role and creating at least one action associated with each created rule. Each execution role transmits (414) data representative of its health state to the memory cache worker role. The monitoring service retrieves (416) the data representative of the health state of each registered execution role from the memory cache worker role. The monitoring service then compares the retrieved data representative of the health state of each registered execution role with the at least one rule associated with each registered execution role. And the monitoring service performs (418) the at least one action associated with the rule on the associated execution role automatically in response to the rule matching the retrieved health state of the execution role.

In another aspect, the present disclosure provides a method of automatically recovering execution roles in a distributed historian system. The method includes registering (412) at least one execution role of a plurality of execution roles with a monitoring service upon startup of the at least one execution role. The registering includes creating at least one rule associated with a health state of the execution role and creating at least one action associated with each created rule. The monitoring service retrieves (416) the health state of the registered execution role and compares the retrieved health state with the at least one rule associated with the execution role. The monitoring service also performs (418) the at least one action associated with the rule on the associated execution role automatically in response to the rule matching the retrieved health state.

In yet another aspect, a computer readable storage device (e.g., memory 704) stores processor readable instructions that, when executed by a processor (e.g., processor 702), implement a method of automated recovery of execution roles in a distributed historian system (e.g., historian system 100). The method includes registering (412) a plurality of execution roles with a monitoring service upon startup of each execution role. The registering includes creating within the monitoring service at least one rule associated with a health state of the execution role and creating within the monitoring service at least one action associated with each created rule. The method includes each execution role transmitting (414) its health state to a memory cache worker role. The monitoring service retrieves the health state of the registered execution roles from the memory cache worker role. The monitoring service also compares the retrieved health states with the at least one rule associated with each execution role and performs the at least one action associated with the rule on the associated execution role automatically in response to the rule matching the retrieved health state.

In one form, at least one rule is a domain-specific rule that is specific to a domain of the distributed historian system. In another form, the at least one domain-specific rule is customized to each execution role based on a responsibility of the execution role. In yet another form, at least one rule is a default rule that is common to two or more of the execution roles. In another form, the execution roles are either a web role or a worker role. In yet another form, at least one action is a reboot, an alert, and a custom action adhering to an IAction interface. In another form, the monitoring service is a kernel of the distributed historian system.

Embodiments of the present disclosure may comprise a special purpose computer including a variety of computer hardware, as described in greater detail below.

Embodiments within the scope of the present disclosure also include computer-readable media for carrying or having computer-executable instructions or data structures stored thereon. Such computer-readable media can be any available media that can be accessed by a special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the disclosure may be implemented. Although not required, aspects of the disclosure will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the disclosure may be practiced in network computing environments with many types of computer system configurations, including personal computers, hand-held devices, multiprocessor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the disclosure includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes read only memory (ROM) and random access memory (RAM). A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, solid state drives (SSDs), and the like.

The computer typically includes a variety of computer readable media. Computer readable media can be any available media that can be accessed by the computer and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media are non-transitory and include, but are not limited to, RAM, ROM, EEPROM, flash memory or other memory technology, CD-ROM, digital versatile disks (DVD) or other optical disk storage, SSDs, magnetic cassettes, magnetic tape, magnetic disk storage or other magnetic storage devices, or any other medium which can be used to store the desired non-transitory information, which can be accessed by the computer. Alternatively, communication media typically embody computer readable instructions, data structures, program modules or other data in a modulated data signal such as a carrier wave or other transport mechanism and includes any information delivery media.

Program code means comprising one or more program modules may be stored on the hard disk, magnetic disk, optical disk, ROM, and/or RAM, including an operating system, one or more application programs, other program modules, and program data. A user may enter commands and information into the computer through a keyboard, pointing device, or other input device, such as a microphone, joy stick, game pad, satellite dish, scanner, or the like. These and other input devices are often connected to the processing unit through a serial port interface coupled to the system bus. Alternatively, the input devices may be connected by other interfaces, such as a parallel port, a game port, or a universal serial bus (USB). A monitor or another display device is also connected to the system bus via an interface, such as video adapter 48. In addition to the monitor, personal computers typically include other peripheral output devices (not shown), such as speakers and printers.

One or more aspects of the disclosure may be embodied in computer-executable instructions (i.e., software), routines, or functions stored in system memory or non-volatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects of the disclosure.

Embodiments may be implemented with computer-executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A historian system comprising one or more processors and one or more computer readable media, the one or more computer readable media including instructions stored thereon that when executed by the historian system implement:

an execution role, a memory cache worker role,
a monitoring service,
at least one rule, and
at least one corrective action;
wherein the execution role is configured to create the at least one rule, the at least one rule associated with a current health state of the execution role,
wherein the execution role is configured to create the at least one corrective action, the at least one corrective action associated with the at least one rule;
wherein the execution role is configured to transmit the current health state of the execution role to the memory cache worker role;
wherein the memory cache worker role is configured to receive and store data representing the current health state of the execution role;
wherein the monitoring service is configured to monitor the current health state of the execution role;
wherein the monitoring service is configured to compare a retrieved current health state with the at least one rule, and
wherein the monitoring service is configured to automatically implement the at least one corrective action on the execution role in response to a health state of the execution role triggering the at least one rule.

2. The historian system of claim 1,
wherein the at least one corrective action comprises a self-healing automated recovery of the execution role in the historian system.

3. The historian system of claim 1,
wherein the at least one rule is at least one domain-specific rule specific to a domain of the historian system.

4. The historian system of claim 3,
wherein the at least one domain-specific rule is customized based on a responsibility of the execution role associated therewith.

5. The historian system of claim 1,
wherein the execution role is two or more execution roles; and
wherein the at least one rule is a default rule common to the two or more execution roles.

6. The historian system of claim 1,
wherein the execution role comprises at least one of a web role and a worker role.

7. The historian system of claim 1,
wherein the at least one corrective action comprises at least one of a reboot, an alert, and a custom action adhering to an IAction interface.

8. The historian system of claim 1,
wherein the monitoring service comprises a kernel of the historian system.

9. The historian system of claim 1,
wherein the historian system is coupled to a communications infrastructure, a process controller, and sensors.

10. A historian system comprising:
a cloud computing service comprising one or more processors and one or more computer readable media, the one or more computer readable media including instructions stored thereon that when executed cause the historian system to:
 receive, by the one or more processors, tag metadata and raw time-series data via one or more execution roles;
 monitor, by the one or more processors, a current health state of the one or more execution roles;
 receive and store, by a memory cache worker role, data representing the current health state of the one or more execution roles;
 compare, by the one or more processors, the current health state with at least one rule;
 continue, by the one or more processors, operation of the one or more execution roles when the current health state does not satisfy the at least one rule; and
 implement, by the one or more processors, at least one corrective action on the one or more execution roles when the current health state satisfies the at least one rule.

11. The historian system of claim 10,
wherein the at least one corrective action comprises a self-healing automated recovery of the one or more execution roles in the historian system.

12. The historian system of claim 10,
wherein the at least one rule is at least one domain-specific rule specific to a domain of the historian system.

13. The historian system of claim 12,
wherein the at least one domain-specific rule is customized based on a responsibility of the one or more execution roles associated therewith.

14. The historian system of claim 10,
wherein the at least one rule is a default rule common to the one or more execution roles.

15. The historian system of claim 10,
wherein the one or more execution roles comprise at least one of a web role and a worker role.

16. The historian system of claim 10,
wherein the at least one corrective action comprises at least one of a reboot, an alert, and a custom action adhering to an IAction interface.

17. The historian system of claim 10,
further comprising a monitoring service that monitors the current health state;
wherein the monitoring service comprises a kernel of the historian system.

18. The historian system of claim 10,
wherein the historian system is coupled to a process controller network, a SCADA system, and/or an EMI/OI system.

* * * * *